United States Patent
Gondi et al.

(10) Patent No.: US 10,942,670 B2
(45) Date of Patent: Mar. 9, 2021

(54) DIRECT ACCESS FLASH TRANSITION LAYER

(71) Applicant: VMware, Inc., Palo Alto, CA (US)

(72) Inventors: Anjaneya Prasad Gondi, Fremont, CA (US); Hemanth Kalluri, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 39 days.

(21) Appl. No.: 16/211,728

(22) Filed: Dec. 6, 2018

(65) Prior Publication Data

US 2020/0183611 A1 Jun. 11, 2020

(51) Int. Cl.
*G06F 3/06* (2006.01)
*G06F 9/455* (2018.01)

(52) U.S. Cl.
CPC .......... *G06F 3/0655* (2013.01); *G06F 3/0604* (2013.01); *G06F 3/0676* (2013.01); *G06F 3/0679* (2013.01); *G06F 9/45558* (2013.01); *G06F 2009/45583* (2013.01)

(58) Field of Classification Search
CPC .... G06F 3/0655; G06F 3/0604; G06F 3/0676; G06F 3/0679; G06F 2009/45583; G06F 9/45558
See application file for complete search history.

(56) References Cited

U.S. PATENT DOCUMENTS

| | | | | |
|---|---|---|---|---|
| 5,974,544 | A * | 10/1999 | Jeffries | G06F 11/1092 710/10 |
| 9,250,943 | B2 * | 2/2016 | Chen | G06F 9/5016 |
| 2013/0254459 | A1 * | 9/2013 | Laplace | G06F 21/53 711/103 |
| 2014/0108759 | A1 * | 4/2014 | Iwamitsu | G06F 3/0604 711/165 |
| 2014/0297941 | A1 * | 10/2014 | Rajani | G06F 3/0665 711/114 |
| 2015/0160884 | A1 * | 6/2015 | Scales | G06F 3/067 711/114 |
| 2016/0328348 | A1 * | 11/2016 | Iba | G06F 13/4022 |
| 2018/0018135 | A1 * | 1/2018 | Shen | G06F 3/0604 |
| 2018/0321964 | A1 * | 11/2018 | Tsuji | G06F 9/4401 |

* cited by examiner

*Primary Examiner* — Nanci N Wong
(74) *Attorney, Agent, or Firm* — Patterson + Sheridan, LLP

(57) ABSTRACT

The disclosure provides an approach for accessing data stored in a page addressable memory by a first virtual computing instance (VCI) running on a host, the host running a virtualization layer configured to provide access to resources to the first VCI. The approach includes mapping by a flash translation layer (FTL) of the virtualization layer a first virtual address received in an I/O request from the first VCI directly to a physical page address (PPA) of the page addressable memory. The approach includes issuing an access request to the page addressable memory based on the I/O request, the access request comprising the PPA. The approach includes receiving data stored at the PPA from the page addressable memory. The approach includes passing the data to the first VCI.

20 Claims, 3 Drawing Sheets

DIRECT ACCESS FLASH TRANSITION LAYER

BACKGROUND

Traditional file systems are designed to work with block storage devices such as hard drives (HDDs) with spinning media, etc. Reads and writes to the HDDs are performed using block operations, and therefore traditional file systems are configured to generate read and write commands to storage in terms of blocks.

However, use of such HDDs has increasingly been replaced with the use of flash based storage devices (e.g., solid state drives (SSDs)) because flash based storage devices can provide better performance over regular HDDs. For example, flash based storage devices have a high memory density, are light weight, are shock resistant, and do not require physical seek time, which can be on the order of several milliseconds for HDDs.

Unlike HDDs, flash based storage devices correspond to page addressable storage instead of block addressable storage. For example, read and write operations to the flash based storage devices are performed using page operations instead of block operations. In particular, a block may correspond to a portion of a page, and therefore page operations are different from block operations.

Traditional file systems, however, are still configured to access storage based on block (or sector) operations, even though the properties of page addressable storage are different. Accordingly, a flash translation layer (FTL) may be used to perform translation between blocks and pages to allow a traditional file system to access page addressable storage. Data stored in page addressable storage can be accessed using a traditional FTL as described below. The example provided is with respect to a host machine configured to run one or more virtual machines (VMs).

Generally, a host file system of the host machine receives a read or write operation to storage. For example, the host file system may receive the read or write operation from a VM running on the host. The read or write operation includes a virtual address (VA), which corresponds to a storage location on a virtual disk of the VM. The host file system first converts the VA to a logical block address (LBA) associated with the virtual disk. In particular, the virtual disk is actually implemented as a file in the host file system, and not a physical disk, so the virtual address which corresponds to the virtual disk being treated as a physical disk is converted to the LBA which instead acts like a file offset to the virtual disk file. The LBA is a block based unit that is not compatible with the physical page address (PPA) of a page addressable storage. Thus, when the LBA is sent to the page addressable storage, the FTL located on the page addressable storage must map the LBA to the PPA of the page addressable storage. However, this requires the FTL to perform excessive reading and writing (referred to as write amplification) which decreases the lifespan and performance over time of the page addressable storage as memory cells get deteriorated during each read/write cycle.

For example, a VM is configured to access page addressable storage using block operations (e.g., using 512 byte sectors). Though a block operation is for reading or writing only a block of data which is less than a page, the entire page including the block of data is still accessed in a page addressable storage based on the block operation. Thus, even if the VM needs to access a full memory page of data of the page addressable memory (e.g., 4096 bytes (or 4K) for a typical NAND flash based SSD), the VM performs the access using a number of block operations, and therefore the entire memory page is accessed multiple times corresponding to the number of block operations. Thus, multiple reads/write are used by the FTL to access a single page in the page addressable memory (e.g., using eight 4K read/write operations, wherein each read/write operation stores 512 bytes to the memory page until all 4K of the data is saved to the 4K memory page).

In many current applications, there are even more translation layers. For example, as applications running on VMs and other types of virtual computing instances (VCIs) continue to increase in size, multiple layers of translation (or mappings) are implemented to facilitate access to the page addressable memory, which may be several abstraction layers away from a VM. These translation layers are further complicated when one or more page addressable memory is shared across multiple VCIs. For example a datacenter may have a large page addressable memory, such as a large SSD on a host machine that is shared by a plurality of VMs, wherein each VM may be running different file systems. Each layer of abstraction increases access time by needing to map the VA of a virtual disk to LBAs, files offsets, other LBAs, etc. as explained below in more detail. It will be appreciated that using multiple translation layers decreases the speed of accessing (e.g., reading/writing) the page addressable memory.

In certain embodiments, a page addressable memory may be directly allocated to a VM to reduce the number of translation layers; however, this prevents resource sharing of the page addressable memory, thereby negating a major benefit of virtualized computing environments, such as security and cost effective distribution of resources to name a few. Thus there exists a need for improved access to page addressable memory that allows resources to be shared across multiple VCIs.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
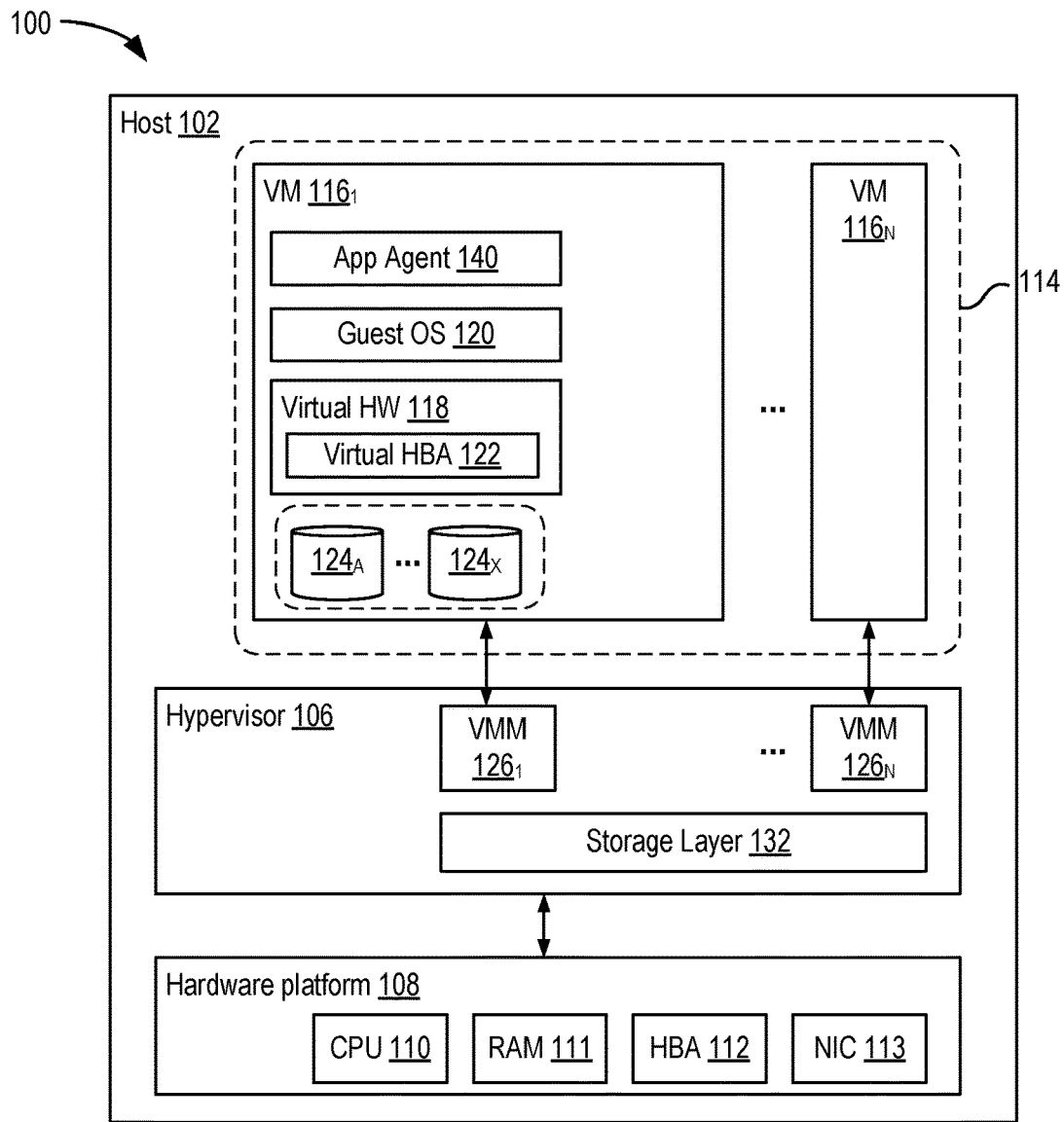
FIG. 1 depicts a block diagram of a computer system in which one or more embodiments of the present disclosure may be utilized.
Figure 1:
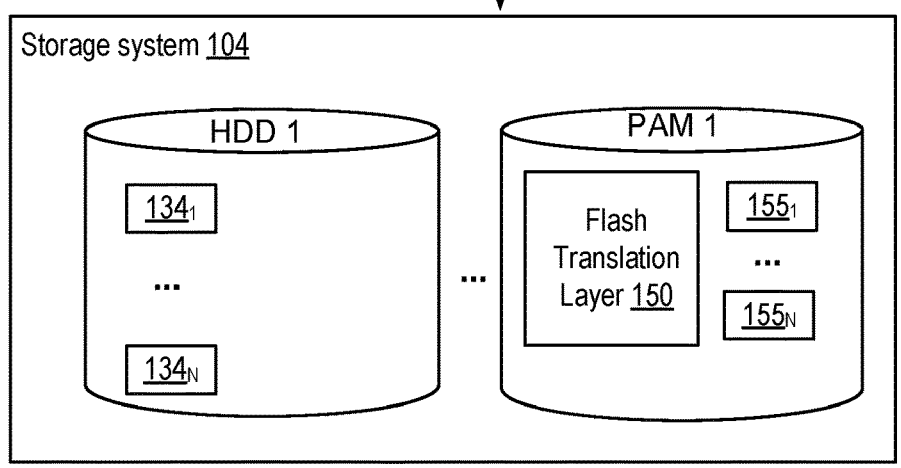

FIG. 1 is a block diagram that illustrates a computer system 100 according to one or more embodiments of the present disclosure. Computer system 100 includes one or more hosts 102 configured to provide a virtualization layer that abstracts processor, memory, storage, and networking resources, etc., of a hardware platform 108 into multiple virtual machines (VMs) 116 that run concurrently on the same host 102. VMs 116 run on top of a software interface layer, referred to as a hypervisor 106, which enables sharing of the hardware resources of host 102 by VMs 116. One example of hypervisor 106 is a VMware ESXi hypervisor provided as part of the VMware vSphere solution made commercially available from VMware, Inc. Though certain embodiments are described herein with respect to data storage for virtual machines, it should be noted that similar techniques may be used to provide data storage to other types of virtual computing instances or even physical computing devices.

Host 102 may comprise a computer system having one or more virtual machines accessing data stored on a storage system 104 in communication with host 102. Host 102 may be constructed on a conventional, typically server-class, hardware platform 108 or another suitable hardware platform. Hardware platform 108 of host 102 may include conventional physical components of a computing device, such as a processor (CPU) 110, a memory 111, a disk interface 112, and a network interface card (NIC) 113. Processor 110 is configured to execute instructions, for example, executable instructions that perform one or more operations described herein and that may be stored in memory 111. Memory 111 and storage system 104 are devices allowing information, such as executable instructions, virtual disks, and other data, to be stored and retrieved. Memory 111 may include, for example, one or more random access memory (RAM) modules. Storage system 104 may include one or more storage devices, for example, one or more page addressable storage devices (e.g., NAND and/or NOR based SSDs). In some embodiments, storage system 104 may include one or more locally attached storage devices and/or a shared storage system having one or more storage arrays such as a storage area network (SAN), a distributed virtual SAN, or a network-attached storage (NAS), as well as other network data storage systems. While storage system 104 is depicted as a separate, external component to host 102, storage system 104 may be internal to host 102, for example, a local storage device or locally attached storage. Disk interface 112, such as a host bus adapter (HBA), enables host 102, and VMs 116 running on host 102, to access a storage device, such as storage system 104, as described later. Network interface 113 enables host 102 to communicate with another device via a communication medium, such as a communication network (not shown). An example of network interface 113 is a network adapter, also referred to as a Network Interface Card (NIC).

As shown in FIG. 1, a hypervisor 106 is installed on top of hardware platform 108 and supports a virtual machine execution space 114 within which multiple virtual machines (VMs) $116_1$-$116_N$ may be instantiated and executed. Each such virtual machine $116_1$-$116_N$ implements a virtual hardware platform 118 that supports the installation of a guest operating system (OS) 120 which is capable of executing one or more applications. Examples of a guest OS include Microsoft Windows, Linux, and the like. In each instance, guest OS 120 includes a native file system layer, for example, either an NTFS or an ext3 type file system layer. These file system layers interface with virtual hardware platforms 118 to access, from the perspective of guest operating systems 120, a data storage HBA, which in reality, is virtual HBA 122 implemented by virtual hardware platform 118 that provides the appearance of disk storage support (virtual disks $124_A$-$124_X$) to enable execution of guest OS 120 transparent to the virtualization of the system hardware. In certain embodiments, a virtual disk 124 exposes the same abstraction as a real (physical) disk, that is, a linear list of sectors; however, a virtual machine monitor (VMM) may choose to implement virtual disks 124 as regular files on the host. Although, from the perspective of guest operating system 120, file system calls initiated by the guest operating system 120 to implement file system-related data transfer and control operations appear to be routed to virtual disks $124_A$-$124_X$ for final execution, in reality, such calls are processed and passed through virtual HBA 122 to adjunct VMM layers $126_1$-$126_N$ that implement the virtual system support needed to coordinate operation with hypervisor 106. In particular, a HBA emulator of each VMM 126 functionally enables the data transfer and control operations to be correctly handled by hypervisor 106 which ultimately passes such operations through its various layers to true hardware HBAs 112 or NIC 113 that connect to storage system 104 as described in more detail below.

Hypervisor 106 includes a storage layer 132 configured to manage storage space persistently for VMs 116 via VMM layers $126_1$ to $126_N$. In one embodiment, storage layer 132 may include numerous logical layers, such as an I/O virtualization layer, a file system driver, and a disk access layer. In some embodiments, the I/O virtualization layer receives a data transfer and control operation (in the form of I/O commands, for example, intended for a virtual disk) from VMM layers $126_1$ to $126_N$, and converts the operations into file system operations that are understood by a virtual machine file system (VMFS) driver in order to access a file stored in underlying storage under the management of the VMFS driver that represents virtual disk 124. The I/O virtualization layer then issues these file system operations to the VMFS driver. The VMFS driver, in general, manages creation, use, and deletion of files (e.g., such as .vmdk files representing virtual disks) stored on physical locations of, or in logical volumes or Logical Unit Numbers (LUNs) exposed by, storage system 104. The VMFS driver converts the file system operations received from the I/O virtualization layer to raw SCSI operations, which are issued to a data access layer that applies command queuing and scheduling policies to the raw SCSI operations and ultimately sends the raw SCSI operations to components of physical hardware platform 108. While storage layer 132 is depicted as part of a virtualized architecture, it should be recognized that embodiments of the present disclosure can be extended to other systems having a storage layer. For example, in an alternative embodiment, storage layer 132 may be a file system driver of an operating system that manages storage space persistently for locally attached storage.

It should be recognized that the various terms, layers and categorizations used to describe the virtualization components in FIG. 1 may be referred to differently without departing from their functionality or the spirit or scope of the invention. For example, VMMs 126 may be considered separate virtualization components between VMs 116 and hypervisor 106 (which, in such a conception, may itself be considered a virtualization "kernel" component) since there exists a separate VMM for each instantiated VM. Alternatively, each VMM may be considered to be a component of its corresponding virtual machine since such VMM includes the hardware emulation components for the virtual machine. In such an alternative conception, for example, the conceptual layer described as virtual hardware platform 118 may be merged with and into VMM 126 such that virtual host bus adapter 122 is removed from FIG. 1 (i.e., since its functionality is effectuated by a host bus adapter emulator within VMM 126).

Storage layer 132 can use metadata for facilitating the dynamic allocation of storage blocks $134_1$ to $134_n$ (sometimes referred to as disk blocks, disk sectors, or sectors) of HDD 1 and other operations on storage system 104. For example, storage layer 132 is configured to receive and/or execute space allocation requests for storage blocks 136 that can be used to handle requests to write data to storage system 104. In some embodiments, storage layer 132 uses storage metadata for such tasks as remembering which storage blocks $134_1$ to $134_n$ are allocated and which storage blocks are free (e.g., bitmaps), or allowing quick random access to an arbitrary block in a particular file (e.g., key-value stores such as B-trees, Log-structured Merging (LSM) trees, rocksdb, and the like). In certain embodiments, storage system 104 contains a page addressable storage also referred to as a page addressable memory (PAM), shown as PAM 1. PAM 1 includes a flash translation layer (FTL) 150 and pages $155_1$ to $155_n$, and is described in more detail with respect to FIG. 2.

Figure 2:
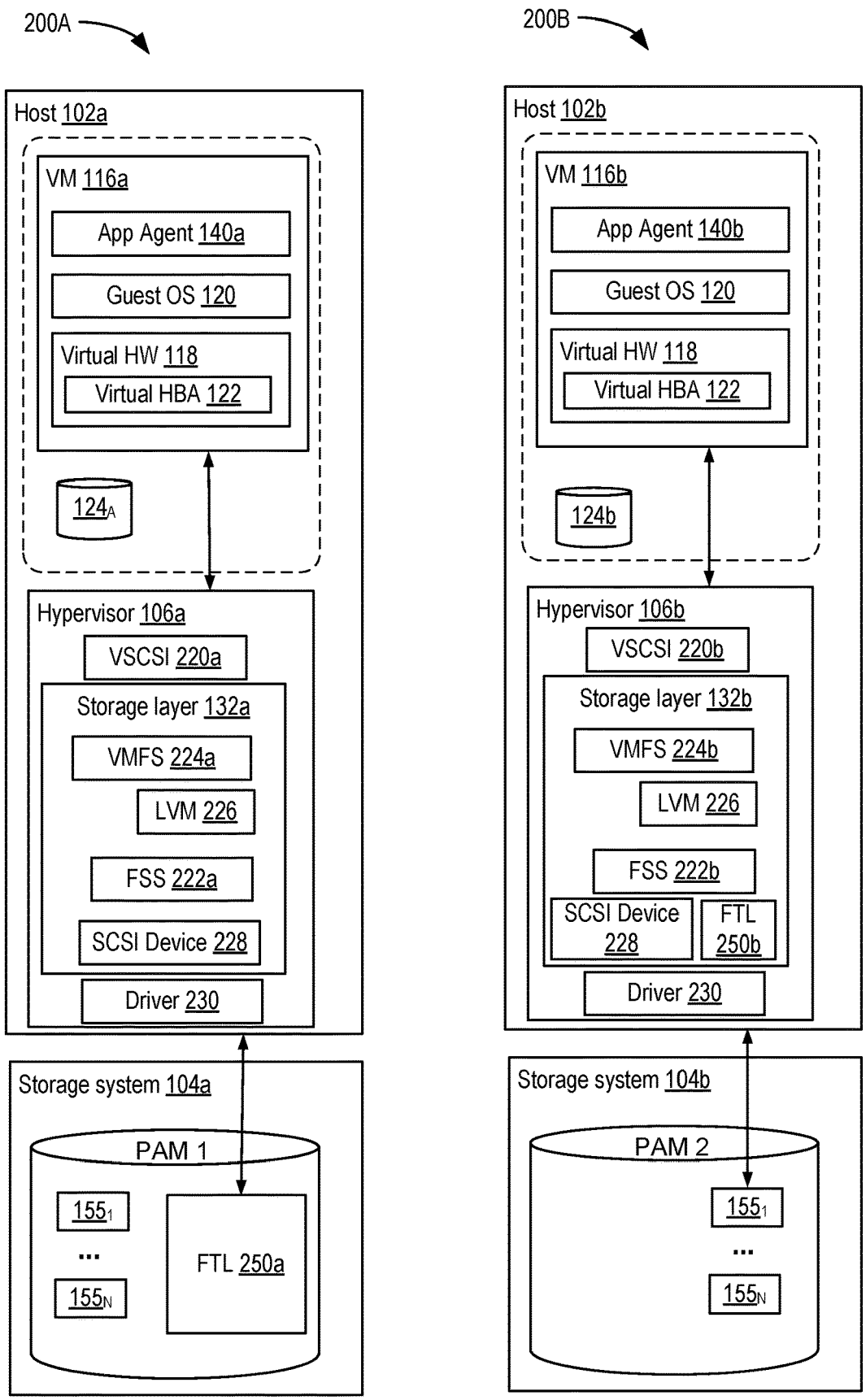
FIG. 2 depicts a block diagram of a computer system in which one or more embodiments of the present disclosure may be utilized.

FIG. 2 depicts a partial block diagram of two computing environments 200A and 200B in accordance with certain embodiments of the present disclosure. Computing environment 200A depicts a system characterized by FTL 250a being located entirely inside (e.g., as hardware and software) PAM 1. In computing environment 200A, VM 116a is configured to save files to PAM 1 of storage system 104a, which is a PAM that includes memory pages $155_1$ to $155_n$. In certain embodiments, app agent 140a generates an I/O request (e.g., read, write, etc.) to PAM 1 by generating an I/O request to virtual disk 124a (or blocks of virtual disk 124a) that is backed by/stored as one or more virtual disk files on PAM 1 and mounted by guest OS 120 to the VM 116a. In one embodiment, such I/O requests may be read requests and write requests for blocks that are, for example, ultimately formatted by guest OS 120 (or a storage device driver in guest OS 120), into SCSI command block requests intended for virtual disk 124a (although it should be recognized that other appropriate hardware connection interface standards known to those with ordinary skill in the art, including IDE, ATA, SAS and SATA may be used in alternative embodiments). The I/O request includes a virtual address (VA) corresponding to virtual disk 124a as discussed. In certain embodiments, the VA corresponds to a particular disk offset with respect to the SCSI disk represented by virtual disk 124a.

Virtual HBA 122 forwards the I/O request from the VM 116a into the I/O stack of hypervisor 106a in order to ultimately reach virtual disk 124a stored within PAM 1. It should be recognized that the configuration of components in computing environment 200A is merely exemplary and that alternative embodiments that may practice the techniques described herein may utilize different components or configurations.

In embodiments, one of the first layers of the I/O stack of hypervisor 106a is a virtual SCSI (vSCSI) layer 220a that, for example, receives an I/O request from virtual HBA 122, in the form of a SCSI read or write command block. vSCSI 220a then converts the I/O request (e.g., SCSI command block) into file system operations that are understood by VMFS layer 224a in storage layer 132a and forwards such file system operations as the I/O request to VMFS 224a. For example, the virtual address is mapped ($1^{st}$ mapping) from the VA to a file offset (e.g., also referred to as a virtual logical block address (vLBA)) by vSCSI 220a. In particular, the disk offset represented by the VA is mapped to a file offset with respect to the actual virtual disk file of virtual disk 124a. In certain embodiments, where there are multiple VMs 116 on host 102a, each VM 116 has its own corresponding vSCSI layer that presents the virtual disk(s) of the VM as physical disks to the VM. Further, in certain embodiments, hypervisor 106a includes a single storage layer 132a that receives I/O requests from the multiple vSCSI layers associated with the multiple VMs.

VMFS 224a, in general, governs and manages how files (such as virtual disk files for virtual disk 124a) are created, used, and deleted on storage used by hypervisor 106a, including PAM 1 and potential other storage devices. One example of an implementation of VMFS 224a is VMware's virtual machine file system, which is described in patent application Ser. No. 10/773,613 that is titled, "Multiple Concurrent Access To A File System" filed Feb. 4, 2004, which is hereby incorporated by reference in its entirety. VMFS 224a, in turn, may convert/map the file system operations to volume block operations, such as based on a mapping provided by a logical volume manager (LVM) 226. For example, the VMFS 224a converts/maps ($2^{nd}$ mapping) the file offset of the file system operation into a logical block address (LBA) associated with PAM 1 (e.g., also referred to as a physical LBA) where the virtual disk file of the virtual disk 124a is stored. In certain embodiments, multiple storage devices may be in communication with host 102a. In this case, a physical device LBA may span multiple storage devices (not shown), and the physical LBA is mapped ($3^{rd}$ mapping) to a storage device specific physical LBA, e.g., a PAM specific LBA of PAM 1.

The VMFS 224a passes the volume block operation including the physical LBA at the I/O request to file system switch (FSS) layer 222a. FSS 222a is configured to route the volume block operation to the correct physical storage device (e.g., PAM 1). For example, hypervisor 106a, as discussed, may be configured to access several different storage devices, such as of different types (e.g., SCSI, NFS, etc.). Each storage device is configured to register with the FSS 222a and indicate its type. FSS 222a, upon receiving the volume block operation, determines the storage device the volume block operation is directed to, and also determines the type of the storage device. FSS 222a then sends the volume block operation to a subsystem configured to handle volume block operations of the determined type. For example, SCSI device subsystem 228, as shown, is a subsystem configured to handle volume block operations directed to SCSI devices. In this embodiment, PAM 1 is registered as a SCSI device and therefore FSS 222a routes the volume block operation to SCSI device 228.

SCSI device 228 finally sends the physical LBA to PAM 1 as the I/O request, such as via a driver 230 for PAM 1, where FTL 250a maps ($4^{th}$ mapping) the physical LBA from to the physical page address (PPA) within PAM 1, where data is accessed. PAM 1 may then return the data in the physical PPA to hypervisor 106a, which routes the data back to VM 116a and ultimately app agent 140a. It will be appreciated that each of these four mappings take time and therefor reduce access speeds. Additionally, because the physical LBA is a block based operation and PAM 1 contains pages (not blocks), FTL 250a accesses each block of a page successively (e.g., reading the entire page and writing a block, following by reading the entire page, and writing the next block, etc.), even if a full page of data was sent or requested from the VM.

Computing environment 200B depicts a direct access FTL 250b in accordance with certain embodiments of the present disclosure. FTL 250b is located inside hypervisor 106b on host 102b (e.g., as part of storage layer 132b or vSCSI 220b), but it will be appreciated that FTL 250b, which may be implemented as hardware, software, or a combination of hardware and software, or may be included in other file system layers of hypervisor 106b. PAM 2 is shown as a PAM with device pass-though (e.g., a device characterized by having one or more pages (e.g., pages $155_1$ through $155_n$) directly accessible by host 102b (e.g., by hypervisor 106b)).

It will be appreciated that PAM 2 may include a FTL layer within PAM 2 (not shown) as long as one or more pages are accessible by host 102*b* (e.g., by bypassing or deactivating the FTL layer for at least one or more pages). PAM 2 may be any type of page addressable memory (e.g., NAND/NOR flash based SSDs). PAM 2 includes pages $155_1$ to $155_n$.

In computing environment 200B, hypervisor 106*b* is enabled to generate I/O requests to PAM 2 as page requests, instead of block requests, and therefore access PAM 2 using pages instead of blocks, which can reduce the number of reads and writes the PAM 2 utilizes to perform I/O, thereby improving functioning of the computing environment 200B as compared to computing environment 200A. Hypervisor 106*b* is enabled to do so through the location of FTL 250*b* inside hypervisor 106*b* and the functioning of other layers of the I/O stack of hypervisor 106*b* as discussed further herein.

In certain embodiments, app agent 140*b* generates an I/O request to PAM 2. For example, app agent 140*b* generates an I/O request to virtual disk 124*b* that is backed by/stored as one or more virtual disk files on PAM 2 and mounted by guest OS 120 to the VM 116*b*. Guest OS 120 (or a storage device driver in guest OS 120) formats the I/O request into a virtual PAM command request (instead of a SCSI block command request) intended for virtual disk 124*b*. In some embodiments, the I/O request includes a virtual address (VA) corresponding to a block of virtual disk 124*b*. For example, guest OS 120 is configured to present virtual disk 124*b* to app agent 140*b* as a block addressable storage. However, guest OS 120 is aware that virtual disk 124*b* is stored on a PAM (e.g., as configured by hypervisor 106*b*) and therefore issues a virtual PAM command request instead of a SCSI block command request. The virtual address may be in a virtual address space dedicated for page addressable storage devices of VM 116*b*. In other embodiments, the VA corresponds to a page of virtual disk 124*b* and guest OS 120 is configured to present virtual disk 124*b* to app agent 140*b* as a page addressable storage (e.g., as configured by hypervisor 106*b*). The virtual address may be in a virtual address space dedicated for page addressable storage devices of VM 116*b*

Virtual HBA 122 forwards the I/O request from the VM 116*b* into the I/O stack of hypervisor 106*b* in order to ultimately reach virtual disk 124*b* stored within PAM 2. It should be recognized that the configuration of components in computing environment 200B is merely exemplary and that alternative embodiments that may practice the techniques described herein may utilize different components or configurations.

In embodiments, one of the first layers of the I/O stack of hypervisor 106*b* is vSCSI layer 220*b* that, for example, receives an I/O request from virtual HBA 122, in the form of a virtual PAM command request. vSCSI 220*b* may be configured similar to vSCSI 220*a* in how vSCSI 220*b* handles SCSI block command requests. However, vSCSI 220*b* may be configured to pass the I/O request including the virtual PAM command request including the VA directly to VMFS 224*b* in storage layer 132*b* without performing a mapping.

VMFS 224*b* may be similar in function to VMFS 224*a*. However, VMFS 224*b* is further configured to recognize the virtual PAM command request as a command request to a page addressable storage device, such as using configuration information in LVM 226. Accordingly, VMFS 224*b* is configured to pass the virtual PAM command request including the VA to FSS 222*b*.

FSS 222*b* may be similar in function to FSS 222*b*. However, FSS 222*b* is further configured to determine the type of the storage device the virtual PAM command request is directed to is a page addressable storage. Further, the FTL 250*b* is configured to register with the FSS 222*b* as the subsystem configured to handle requests to page addressable storage. Accordingly, the FSS 222*b* routes the virtual PAM command request to the FTL 250*b*.

The FTL 250*b* is configured to directly map the VA to the corresponding PPA of PAM 2, thereby reducing the number of mappings required to access PAM 2 and improving the functioning of the computing device. For example, FTL 250*b* is configured with a mapping of VAs to PPAs by hypervisor 106*b* as hypervisor 106*b* allocates PPAs to VAs. In certain embodiments, the FTL 250*b* finally sends the physical PPA to PAM 2 in an I/O request, such as via a driver 230 for PAM 2, thereby directly accessing PAM 2 using page addressing instead of block addressing. PAM 2 may then return the data in the physical PPA to hypervisor 106*b*, which routes the data back to VM 116*b* and ultimately app agent 140*b*.

Thus, it will be appreciated, that computing environment 200B provides several benefits over computing environment 200A. For example, VM 116*b* can access PAM 2 with one mapping, where VM 116*a* may require four mappings, which increase processing time and computing requirements.

Further, in certain embodiments, where guest OS 120 is configured to generate a virtual PAM command request with a VA, FTL 250*b* is configured (e.g., along with FSS 222*b*) to perform I/O coalescing. In particular, FTL 250*b* may not immediately access PAM 2 after mapping the VA of a virtual PAM command request. Rather, FTL 250*b* may wait (e.g., for a configurable period of time, configurable number of virtual PAM command requests, etc.) until several virtual PAM command requests are received and coalesce any virtual PAM command requests that map to the same PPA in PAM 2. The FTL 250*b* may then issue a single I/O request to PAM 2 with the PPA for the multiple virtual PAM command requests. PAM 2 may then return the data in the physical PPA to hypervisor 106*b*, which routes the data back to each VM 116 that had a corresponding virtual PAM command request. In certain embodiments, where the guest OS 120 generates a virtual PAM command request with a VA corresponding to a block, several different VAs may map to the same PPA, and the I/O coalescing can reduce the number of I/O requests issued to the PAM 2, thereby reducing the reads and writes performed.

In certain embodiments, FTL 250*b* may be part of vSCSI 220*b* (not shown) instead of being accessed via FSS 222*b*. Accordingly, vSCSI 220*b* may directly perform the mapping of VA to PPA. However, this may require a separate FTL 250*b* for each vSCSI 220*b* of each VM.

In certain embodiments, FTL 250*b* instead is located between VMFS 224*b* and FSS 222*b* instead.

Figure 3:
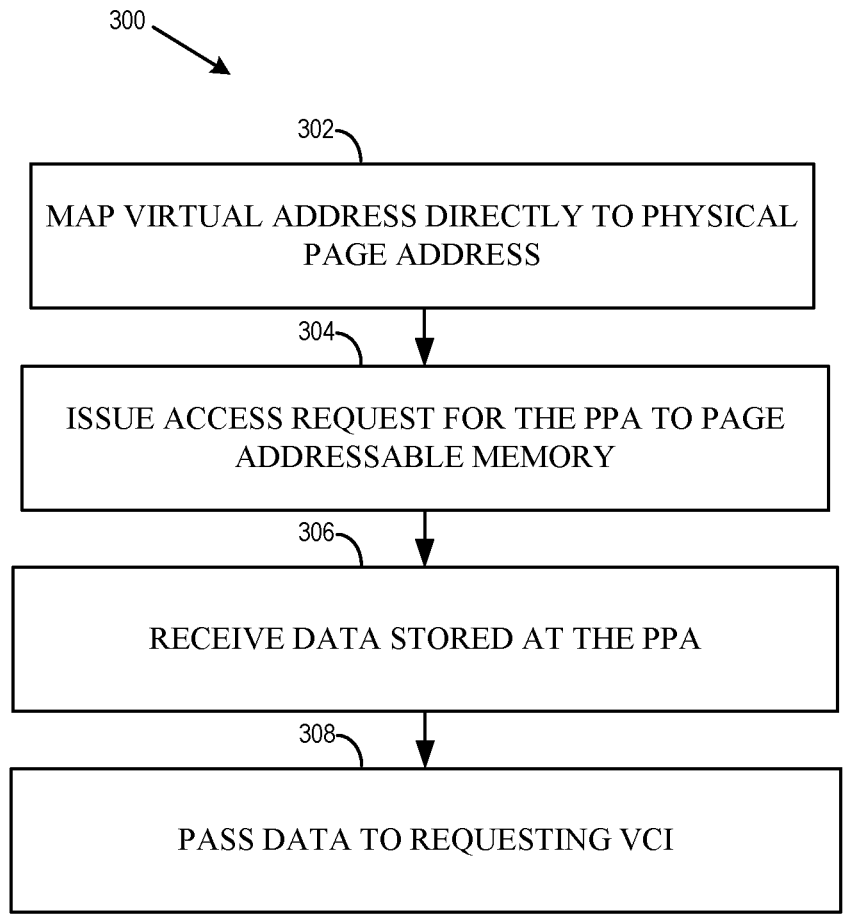
FIG. 3 depicts a flow diagram of a method of accessing data on a page addressable memory, according to an embodiment.

FIG. 3 depicts a flow diagram of a method 300 that includes a direct access flash translation layer (FTL) according to certain embodiments of the disclosure. Method 300 may be performed by an FTL (e.g., FTL 250*b* in FIG. 2) on a file system of a host (e.g., host 102*b* in FIG. 2). In certain embodiments, the FTL may be hardware, software, or a combination of hardware and software. In other embodiments, FTL functionality may be integrated into other layers or components of the file system.

Method 300 provides a method of accessing data on a page addressable memory (PAM) by a virtual computing instance (VCI) running on a host, the host running a virtualization layer configured to provide access to resources to the VCI. At block 302, an FTL (e.g., FTL 250*b*) maps a first virtual address received in an I/O request from the VCI directly to a physical page address (PPA) of the page addressable memory. The I/O request may be to a virtual disk of the first VCI.

At block 304, the host issues an access request to the page addressable memory based on the I/O request, the access request comprising the PPA.

At block 306, the virtualization layer receives data stored at the PPA from the page addressable memory.

At block 308, the virtualization layer passes the data to the VCI.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, application specific integrated circuits (ASICs), field-programmable gate arrays (FPGAs), and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of accessing data stored in a page addressable memory by a first virtual computing instance (VCI) running on a host, the host running a virtualization layer configured to provide access to resources to the first VCI, the method comprising:
   receiving, by a file system switch, a first I/O request from the first VCI;
   determining, by the file system switch, whether the first I/O request from the first VCI is directed to a page addressable storage or to a small computer interface (SCSI) device configured to handle block operations;
   based on determining that the first I/O request is directed to the page addressable storage:
      routing the first I/O request to a flash translation layer (FTL) that is located within the virtualization layer of the host and used to map block addresses to page addresses;
      mapping by the FTL a first virtual address received in the first I/O request from the first VCI directly to a physical page address (PPA) of the page addressable memory;
      issuing an access request to the page addressable memory based on the first I/O request, the access request comprising the PPA;
      receiving first data stored at the PPA from the page addressable memory; and
      passing the first data to the first VCI; and
   based on determining that the first I/O request is directed to the SCSI device, routing the first I/O request to the SCSI device without the mapping of the first virtual address of the first I/O request by the FTL located within the virtualization layer of the host.

2. The method of claim 1, further comprising:
   mapping by the FTL a second virtual address received in a second I/O request from a second VCI directly to the PPA, wherein the access request is issued as a single access request based on both the first I/O request and the second I/O request mapping to the PPA;
   receiving second data stored at the PPA from the page addressable memory; and
   passing the second data to the second VCI.

3. The method of claim 1, further comprising:
   mapping by the FTL a second virtual address received in a second I/O request from the first VCI directly to the PPA, wherein the access request is issued as a single access request based on both the first I/O request and the second I/O request mapping to the PPA, wherein the first virtual address corresponds to a first block within the PPA and the second virtual address corresponds to a second block within the PPA.

4. The method of claim 1, further comprising:
   receiving the first I/O request at a vSCSI layer of the virtualization layer, wherein the FTL is part of the vSCSI layer; and
   passing the first I/O request with the PPA from the vSCSI layer to a storage layer, wherein the storage layer issues the access request.

5. The method of claim 1, further comprising:
   receiving the first I/O request at a vSCSI layer;
   passing the first I/O request from the vSCSI layer to a file system layer;
   passing the first I/O request from the file system layer to the FTL;
   passing the first I/O request with the PPA from the FTL to a file system switch (FSS) layer; and
   passing the first I/O request from the FTL to a device driver, wherein the device driver issues the access request.

6. The method of claim 1, further comprising:
   receiving the first I/O request at a vSCSI layer;
   passing the first I/O request from the vSCSI layer to a file system layer;
   passing the first I/O request from the file system layer to a file system switch (FSS) layer;
   passing the first I/O request from the FSS layer to the FTL;
   passing the first I/O request with the PPA from the FTL to a device driver, wherein the device driver issues the access request.

7. The method of claim 1, wherein the page addressable memory comprises one or more of one or more solid state disks (SSDs) or flash memory.

8. The method of claim 1, wherein the first virtual address corresponds to a page.

9. A host configured to access data stored in a page addressable memory by a first virtual computing instance (VCI) running on the host, the host running a virtualization layer configured to provide access to resources to the first VCI, comprising:
   a memory; and
   at least one processor coupled to the memory, the at least one processor configured to:
      receive, by a file system switch, a first I/O request from the first VCI;
      determine, by the file system switch, whether the first I/O request from the first VCI is directed to a page addressable storage or to a small computer interface (SCSI) device configured to handle block operations;
      based on determining that the first I/O request is directed to the page addressable storage:
         route the first I/O request to a flash translation layer (FTL) that is located within the virtualization layer of the host and used to map block addresses to page addresses;
         map by the FTL a first virtual address received in the first I/O request from the first VCI directly to a physical page address (PPA) of the page addressable memory;
         issue an access request to the page addressable memory based on the first I/O request, the access request comprising the PPA;
         receive first data stored at the PPA from the page addressable memory; and
         pass the first data to the first VCI; and
      based on determining that the first I/O request is directed the SCSI device, route the first I/O request to the SCSI device without the mapping of the first virtual address of the first I/O request by the FTL located within the virtualization layer of the host.

10. The host of claim 9, wherein the at least one processor is further configured to:
    map by the FTL a second virtual address received in a second I/O request from a second VCI directly to the PPA, wherein the access request is issued as a single access request based on both the first I/O request and the second I/O request mapping to the PPA;

receive second data stored at the PPA from the page addressable memory; and pass the second data to the second VCI.

11. The host of claim 9, wherein the at least one processor is further configured to:
map by the FTL a second virtual address received in a second I/O request from the first VCI directly to the PPA, wherein the access request is issued as a single access request based on both the first I/O request and the second I/O request mapping to the PPA, wherein the first virtual address corresponds to a first block within the PPA and the second virtual address corresponds to a second block within the PPA.

12. The host of claim 9, wherein the at least one processor is further configured to:
receive the first I/O request at a vSCSI layer of the virtualization layer, wherein the FTL is part of the vSCSI layer; and
pass the first I/O request with the PPA from the vSCSI layer to a storage layer, wherein the storage layer issues the access request.

13. The host of claim 9, wherein the at least one processor is further configured to:
receive the first I/O request at a vSCSI layer;
pass the first I/O request from the vSCSI layer to a file system layer;
pass the first I/O request from the file system layer to the FTL;
pass the first I/O request with the PPA from the FTL to a file system switch (FSS) layer; and
pass the first I/O request from the FTL to a device driver, wherein the device driver issues the access request.

14. The host of claim 9, wherein the at least one processor is further configured to:
receive the first I/O request at a vSCSI layer;
pass the first I/O request from the vSCSI layer to a file system layer;
pass the first I/O request from the file system layer to a file system switch (FSS) layer;
pass the first I/O request from the FSS layer to the FTL;
pass the first I/O request with the PPA from the FTL to a device driver, wherein the device driver issues the access request.

15. The host of claim 9, wherein the page addressable memory comprises one or more of one or more solid state disks (SSDs) or flash memory.

16. The host of claim 9, wherein the first virtual address corresponds to a page.

17. A non-transitory computer readable medium comprising instructions to be executed by a host, the instructions when executed by the host cause the host to carry out a method of accessing data stored in a page addressable memory by a first virtual computing instance (VCI) running on the host, the host running a virtualization layer configured to provide access to resources to the first VCI, the method comprising:
receiving, by a file system switch, a first I/O request from the first VCI;
determining, by the file system switch, whether the first I/O request from the first VCI is directed to a page addressable storage or to a small computer interface (SCSI) device configured to handle block operations;
based on determining that the first I/O request is directed to the page addressable storage:
routing the first I/O request to a flash translation layer FTL) that is located within the virtualization layer of the host and used to map block addresses to page addresses;
mapping by the FTL a first virtual address received in the first I/O request from the first VCI directly to a physical page address (PPA) of the page addressable memory;
issuing an access request to the page addressable memory based on the first I/O request, the access request comprising the PPA;
receiving first data stored at the PPA from the page addressable memory; and
passing the first data to the first VCI; and
based on determining that the first I/O request is directed the SCSI device, routing the first I/O request to the SCSI device without the mapping of the first virtual address of the first I/O request by the FTL located within the virtualization layer of the host.

18. The non-transitory computer readable medium of claim 17, wherein the method further comprises:
mapping by the FTL a second virtual address received in a second I/O request from a second VCI directly to the PPA, wherein the access request is issued as a single access request based on both the first I/O request and the second I/O request mapping to the PPA;
receiving second data stored at the PPA from the page addressable memory; and
passing the second data to the second VCI.

19. The non-transitory computer readable medium of claim 17, wherein the method further comprises:
mapping by the FTL a second virtual address received in a second I/O request from the first VCI directly to the PPA, wherein the access request is issued as a single access request based on both the first I/O request and the second I/O request mapping to the PPA, wherein the first virtual address corresponds to a first block within the PPA and the second virtual address corresponds to a second block within the PPA.

20. The non-transitory computer readable medium of claim 17, wherein the first virtual address corresponds to a page.

* * * * *